United States Patent [19] [11] 4,113,794
Thompson et al. [45] Sep. 12, 1978

[54] COPOLYMER OF BLOCKS OF RANDOM POLY(DIOXA-AMIDE) AND POLYAMIDE

[75] Inventors: Robert M. Thompson, Wilmington, Del.; Richard S. Stearns, Malvern, Pa.

[73] Assignee: Sun Ventures, Inc., Radnor, Pa.

[21] Appl. No.: 777,999

[22] Filed: Mar. 16, 1977

Related U.S. Application Data

[63] Continuation-in-part of Ser. No. 557,716, Mar. 12, 1975, abandoned, which is a continuation-in-part of Ser. No. 415,582, Nov. 14, 1973, abandoned.

[51] Int. Cl.$^2$ .............................................. C08G 69/40
[52] U.S. Cl. ............................. 260/857 TW; 528/324; 528/335
[58] Field of Search ...................... 260/78 R, 857 TW

[56] References Cited

U.S. PATENT DOCUMENTS 2,339,237   1/1944   Brubaker ........................... 260/78 R

FOREIGN PATENT DOCUMENTS 822,165   5/1975   Belgium.
562,370   2/1946   United Kingdom.
574,713   1/1946   United Kingdom.
615,954   1/1949   United Kingdom.
1,030,344   5/1966   United Kingdom.
1,304,865   1/1973   United Kingdom.

Primary Examiner—Paul R. Michl
Attorney, Agent, or Firm—J. Edward Hess; Donald R. Johnson; Anthony Potts, Jr.

[57] ABSTRACT

Novel copolymer formed by melt blending a melt spinnable polyamide, such as nylon-6, and a block of random poly(dioxa-amide), such as a copolymer prepared from the mixture of caprolactam and the salt of adipic acid and 4,7-dioxadecamethylene diamine, is disclosed. The resulting copolymer, N-30203-6/6//6, has utility as a fiber. The fiber, for example, resulting from melt blending of nylon-6 and the aforementioned random poly(dioxa-amide) has moisture absorption characteristics similar to that of cotton. Furthermore, the resulting fiber still maintains the other desirable properties of the major constituent, for example, nylon-6.

63 Claims, No Drawings

COPOLYMER OF BLOCKS OF RANDOM POLY(DIOXA-AMIDE) AND POLYAMIDE

CROSS REFERENCE TO RELATED APPLICATIONS

This application is a continuation-in-part of U.S. patent application Ser. No. 557,716, filed Mar. 12, 1975, now abandoned, which in turn is a continuation-in-part of U.S. application Ser. No. 415,582, filed Nov. 14, 1973, now abandoned, and the latter is related to Ser. Nos. 415,583, 415,610 and 418,524, all filed Nov. 14, 1973 by Robert M. Thompson all now abandoned. These three applications have as subject matter various block copolymers of polyamides. This application is also related to Ser. No. 415,581, filed Nov. 14, 1973, by Elmer J. Hollstein. Subject matter of the latter application relates to a method for hydrogenation of a dinitrile which is a precursor of a hydrophilic polymer disclosed within the aforementioned related applications.

BACKGROUND OF THE INVENTION

It is known that commercially important polyamides, such as nylon-6 and nylon-6,6, have excellent physical properties in many respects. However, for certain textile application fabrics and similar products prepared from such nylons are somewhat deficient in moisture absorption. This characteristic is important because according to ENCYCLOPEDIA OF POLYMER SCIENCE AND TECHNOLOGY, Vol. 10, Section Polyamide Fibers, moisture absorption determines comfort, ease and cost of dyeing, antistatic character and hand or feel of the fabric. To overcome this moisture absorption deficiency many attempts have been made but none have been commercially successful to date.

Disclosed herein is a novel copolymer which can be converted into a fiber having moisture absorption properties similar to that of cotton, a commercial standard of comparison. This novel copolymer consists of blocks of random poly(dioxa-amide) and blocks of polyamide. Surprisingly, the incorporation of blocks of certain random poly(dioxa-amide) with a certain polyamide does not adversely effect the many desirable fiber properties of the polyamide and yet substantially improves its moisture absorption property. Also the copolymer can be formed into a desired shape by extrusion, injecting molding and other well-known thermoplastic forming methods.

A block copolymer can result when a mixture of polymer X and polymer Y, both of which contain amides is properly processed. Thus the resulting block copolymer contains relatively long chains of a particular chemical composition, the chains being separated by a polymer of different chemical composition; thus diagrammatically

| X | Y | X |

A block copolymer can also contain relatively long chains of a particular chemical composition but in this type the chains are separated by a low molecular weight "coupling group;" thus diagrammatically

| X | Y | X |

Each of the aforementioned polymer chains, i.e., X and/or Y can be a homopolymer or a random copolymer.

Generally, copolymers containing the amide function, i.e.,

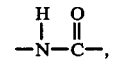

can be formed by melting two polyamides. Thus when two different polyamides are mixed and heated above their melting points they form copolymers. This process is also known as melt blending. However, the length of time the polymers are maintained at a temperature above their melting points has a profound effect on the resulting structure. As the mixing at the elevated temperature begins the molecule is a combination of blocks of random poly(dioxa-amide) and blocks of polyamide. But gradually as the heating and mixing continues the length of the blocks of polyamide decreases because more segments of the random polymer are produced. Thus if the blending and heating occurs for a sufficient time all the "blocks" disappear and mostly random sequences form as evidenced by deterioration of its physical properties including melting point. At present there is no known direct way of determining chain sequences of such a polymer. But indirect methods exist and these are discussed in detail hereinafter. Controlled decomposition of such a copolymer will yield all identifiable components that make up the copolymer but will not indicate sequence.

Polymers, including copolymers, containing amide functional groups generally result from a reaction known as condensation. Condensation refers to a polymer forming reaction in which water can be a by-product. The various types of polymers that can be produced from condensation (or step growth polymerization) are described hereinafter. The initial stage of a condensation polymerization consists of random combinations of two monomeric units to form dimer molecules. Examples of these could be the formation of two units of nylon-11 from the corresponding amino acid (11-aminoundecanoic acid) in the case of an AB polyamide

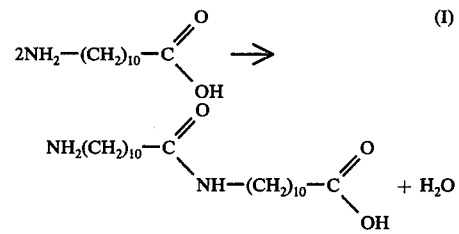

or adipic acid molecule and hexamethylene diamine in an AABB system

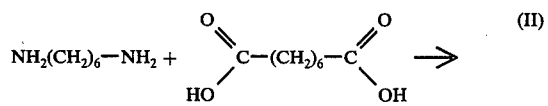

-continued

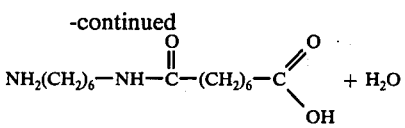

The letter "A" refers to one of the functional groups of the monomer, "B" refers to the other.

The foregoing dimer molecules will combine with equal facility with another monomeric unit or a dimer unit. In this fashion, the average degree of polymerization (DB) builds during the course of the reaction. This is discussed in greater detail in ORGANIC CHEMISTRY OF SYNTHETIC HIGH POLYMERS, Robert W. Lenz, Library of Congress Catalog Card No. 66-22057.

In this same manner, as reactions I and II, random copolymers can be formed. The only condition necessary is that more than one type (or two if an AABB system is used) of monomer unit be present during the condensation reaction. Thus following from the example above where monomers of AB and AABB polymers are present in the same reactor at the beginning of the polymerization, the AB monomer (amino acid) will react with a similar unit or the AABB monomer unit (the diamine or diacid) in a random fashion since their reactivities are similar. The final result of such a polymerization will be a random copolymer. If their reactivities are very dissimilar, there would be a tendency to become blocks, however, units having similar carboxylic and/or similar amine ends have similar reactivities. Further examples of random copolymers are given in U.S. Pat. No. 3,397,107 where the monomer units of nylon 303/T and caprolactam are polymerized in a random fashion. Another example is contained in U.S. Pat. No. 3,594,266 in which a polyethylene oxide diamine, terephthalic acid and caprolactam were polymerized in a random fashion. Since the condensation polymerization is a random sequence of events it would be extremely improbable to obtain an alternating copolymer using dissimilar monomer units in the condensation reaction as it is known today. An alternating copolymer can be classified as a special type of random copolymer.

Formation of a condensation block copolymer cannot be easily achieved using the conditions described heretofore because of the random reaction of monomeric units. Block copolymer preparations have been described in the patent literature using at least two techniques. One technique, as described before, is melt blending two homopolymers at temperatures where the polyamide becomes reactive to amide interchange, chain extension and hydrolysis. Such a technique is disclosed in U.S. Pat. No. 3,393,252. When the conditions are closely controlled block copolymers with long sequence lengths can be optimized even though a certain amount of amide interchange occurs to form an insignificant amount of random sequences.

Another method of preparing block copolymers has been described in U.S. Pat. No. 3,683,047. It consists of polymerizing two homoprepolymers of molecular weight from 1000 to 4000. In this specific case, one prepolymer was carboxyl terminated while the other was amine terminated. The result of the polymerization is a block copolymer. Under the conditions of polymerization very little randomization occurred as indicated by little loss in melting point during the blend time. These block copolymers have been called ordered copolymers since by the nature of the starting materials reactive functional groups they cannot react with themselves.

Examples of random copolymers are as follows: CHEMICAL ABSTRACT 88764f, Vol. 70, 1969, (Japanese Pat. No. 28,837/68) discloses a copolymer prepared from the combination of (a) salt of bis-($\alpha$-aminopropoxy)ethane (also referred to as 30203) and adipic acid and (b) the monomer caprolactam. British Patent 1,169,276 discloses a random copolymer having improved hydrophilic properties prepared from the combination of (a) salt (I) of $H_2N(CH_2)_3$—O—$CH_2$—$C(CH_3)_2$—$CH_2O$—$(CH_2)_3NH_2$ and adipic acid and (b) the monomer caprolactam; also a random copolymer of the aforementioned salt (I) and hexamethylene diammonium adipate [$H_3^+N(CH_2)_6NHCO(CH_2)_6CO^-$] also referred to as nylon-6,6 salt. CHEMICAL ABSTRACT 4514h, Vol. 49, 1955, discloses a random copolymer prepared from the (a) salt (II) of $H_2N(CH_2)_3$-O-$(CH_2)_3$—$NH_2$ and adipic acid and (b) nylon-6,6 salt. Salt (II) upon heating forms a cream-colored material; such discoloration detracts from its utility where clarity is required. U.S. Pat. No. 3,522,329 discloses a random copolymer prepared from the (a) salt of diamine of polyethylene oxide [$HOCH_2CH_2(OCH_2CH_2)_n$] and adipic acid and (b) $\epsilon$-caprolactam (also called caprolactam). U.S. Pat. No. 3,514,498 discloses a random copolymer prepared from the (a) salt of diamine of polyethylene oxide and adipic acid and (b) $\epsilon$-caprolactam.

Examples of block copolymers are as follows. The previously mentioned U.S. Pat. No. 3,514,498 also discloses a block (random) copolymer prepared from two polymers: (a) polymer resulting from the salt of diamine of polyethylene oxide and adipic acid and $\epsilon$-caprolactam and (b) poly-$\epsilon$-capramide (nylon-6). U.S. Pat. No. 3,549,724 also discloses a block (random) copolymer prepared from (a) polymer prepared from polyethylene oxide diammonium adipate and $\epsilon$-caprolactam and (b) nylon-6 or nylon-6,6. U.S. Pat. No. 3,160,677 discloses a block copolymer prepared from (a) a polymer prepared from dibutyloxalate [$COOC_4H_9)_2$] and a diamine and (b) polycaprolactam.

Contrary to expectations based on the previously discussed art it has now been found that it is possible to prepare a composition comprising a copolymer of blocks of polyamide and random poly(dioxa-amide) having moisture uptake equivalent to that of cotton. In addition, fibers of the copolymer have overall fiber properties substantially equivalent to that of such nylons as nylon-6.

SUMMARY OF THE INVENTION

Present invention resides in a novel composition. It has utility as a fiber in addition to other utilities. The composition is a copolymer of blocks of a certain polyamide and blocks of certain random poly(dioxa-amide). The polyamide portion of the molecule is a bivalent radical of a melt spinnable polyamide. The poly(dioxaamide) portion of this molecule contains both a double oxygen linkage, i.e., —R—O—R—O—R— and amide linkage, i.e.,

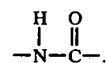

The following repeating structural formula depicts the composition of this invention:

(a) a block component consisting of the following groups

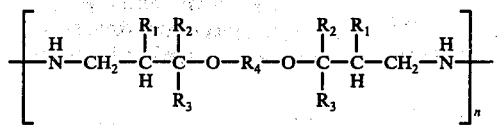

and

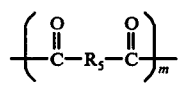

and one of the following:

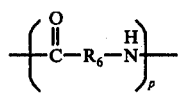

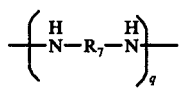

wherein the relative proportions of each are $n = 1-10$, $m = 1-10$, $q = 0-10$ and $p = 0-10$ and said groups within the block are randomized and wherein the

and the

forms an amide linkage; and wherein $R_1$, $R_2$ and $R_3$ are selected from the group consisting of H, $C_1-C_{10}$ alkyls and $C_3-C_{10}$ isoalkyls; $R_4$ is selected from the group consisting of $C_1-C_{10}$ alkylenes and $C_3-C_{10}$ isoalkylenes, $R_5$ is selected from the group consisting of $C_0-C_{14}$ alkylenes, $C_3-C_{10}$ isoalkylenes and $C_6-C_{10}$ arylenes; and $R_6$ and $R_7$ are selected from the group consisting of $C_5-C_{11}$ alkylenes; and wherein said block has a molecular weight of 350–80,000;

(b) and a block component consisting of

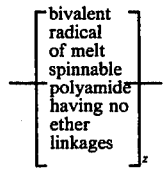

wherein $z = 4-200$. The copolymer has a molecular weight of about 5000–100,000.

DESCRIPTION

As stated heretofore, one portion of the novel composition is a melt spinnable polymer. Melt spinnable refers to a process wherein the polymer, a polyamide, is heated to above its melting temperature and while molten forced through a spinneret. The latter is a plate containing from one to many thousand orifices, through which the molten polymer is forced under pressure. The molten polymer is a continuous filament and depending on the number of orifices many filaments can be formed at the same time. The molten filaments are cooled, solidified, converged and finally collected on a bobbin. This technique is described in greater detail in ENCYCLOPEDIA OF POLYMER SCIENCE AND TECHNOLOGY, Vol. 8, Man-Made Fibers, Manufacture.

If a single fiber is extruded, as in the case when it is intended to be knitted into hosiery, the product is called a monofilament. When the product is expected to be converted into a fabric by knitting or weaving, the number of monofilaments is in the range of 10–100. Such a product is known as multifilament yarn. Yarn for industrial application, such as in the construction of tire cord, usually contains several hundred to a thousand or more filaments. When the fibers are used to make spun yarn, i.e., a yarn formed by twisting short lengths of fibers together, as is the practice with cotton, the number of orifices can rise to tens of thousands. The extruded material is cut into pieces in the range of 1–5 inches long to produce "staple" fiber. This staple fiber is converted into spun yarn in a similar manner as cotton. Polymer of the present invention can be prepared into the aforementioned forms by the various methods disclosed.

Also, the polymers of present invention can be used to prepare nonwovens. Nonwoven refers to a material used as a fabric made without weaving, and in particular having textile fibers bonded or laminated together by adhesive resin, rubber or plastic or felted together under pressure. Many such methods are described in detail in MANUAL OF NONWOVENS, Prof. Depl-Ing and Dr. Radko Kroma, Textile Trade Press, Manchester, England.

Polyamides which are crystallizable and have at least a 30° C difference between melting point and the temperature at which the molten polymer undergoes decomposition can be melt spun. Examples of melt spinnable polyamides having no ether linkages are as follows: nylon-6,6 [also known as poly(hexamethylene adipamide)]; nylon-6,10 [poly(hexamethylene sebacamide)]; nylon-6 [poly(pentamethylene carbonamide)]; nylon-11 [poly(decamethylene carbonamide)]; MXD-6 [poly(-meta-xylene adipamide)]; PACM-9 [bis(para-aminocyclohexyl)methane azelamide]; PACM-10 [bis(para-aminocyclohexyl)methane sebacamide] and PACM-12 [bis(para-aminocyclohexyl)methane dodecanoamide]. Others are listed in ENCYCLOPEDIA OF POLYMER SCIENCE AND TECHNOLOGY, Vol. 10, Section Polyamide Fibers, table 12. Methods for preparing these polyamides are well known and described in numerous well-known patents and trade journals.

The aforementioned block of melt spinnable polyamide can contain as few as 4 repeating units within the copolymer of present invention. Thus z can equal 4. Data reported in the Examples shows that a melt spinnable polyamide, as an illustration, having four repeating units has an estimated melting point which does not differ substantially from the melting point of a relatively high molecular weight polymer. Thus each four repeating unit blocks, when present in a block copolymer, can retain its own particular properties without substantially degrading the properties of the other repeating unit block. To minimize loss of properties the preferred minimum value for $z$ is 8 and the more preferred value is 10; $z$ can have a value as high as 200, however, a preferred maximum value is 185 and a more preferred value is 160. Values of $y$ and $z$ are medium values.

The poly(dioxa-amide) random portion of the composition can be prepared by the following generalized scheme:

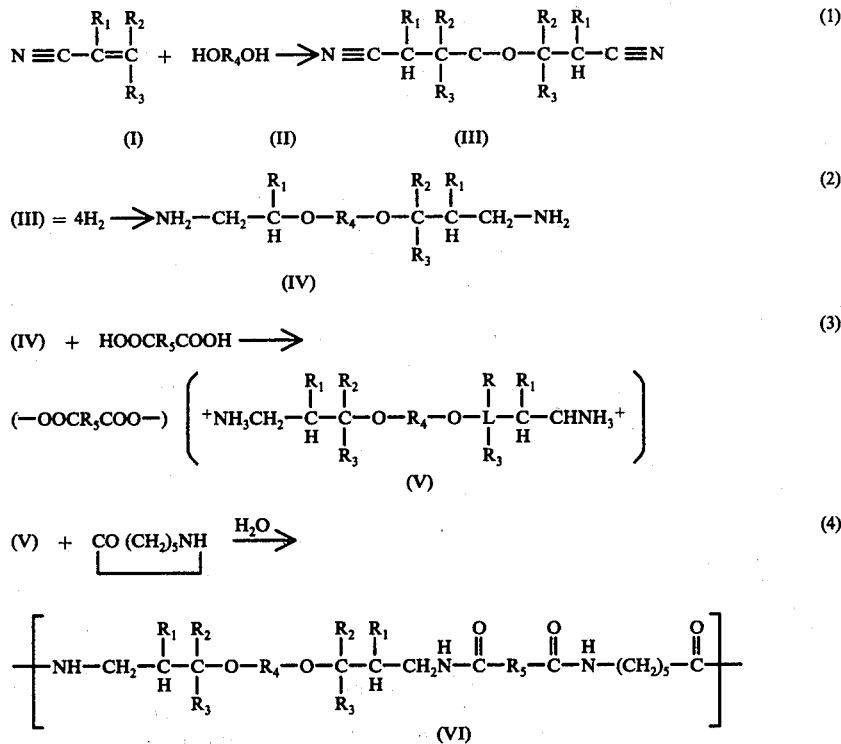

Another generalized scheme, replacing steps (3) and (4) would be as follows:

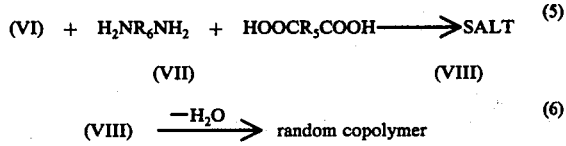

The poly(dioxa-amide) block, as explained, heretofore consists of three groups. One such block could have, in part the following structure:

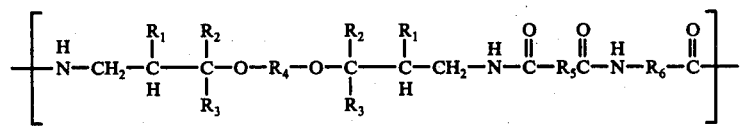

Since the foregoing structure is a portion of the block more groups could be attached in a random manner. In order for the block (of random groups) to retain its own particular properties without substantially degrading the properties of the other repeating unit block it will have a molecular weight between the range of about 350–80,000. A preferred molecular weight range is about 400–70,000 and a more preferred range is about 500–60,000. Generally the weight ratio of component "a" to component "b" is 0.10–1.25, a preferred ration is 0.20–1.10.

Reaction (1) is often referred to as cyanoethylation, particularly wherein $R_1$, $R_2$ and $R_3$ = H; also these R's can be $C_1$–$C_{10}$ alkyls or $C_3$–$C_{10}$ isoalkyls. $R_4$ can be one of the following: $C_1$–$C_{10}$ alkylene and $C_3$–$C_{10}$ isoalkylene. Reaction (2) is a hydrogenation. Reactions (3) and (5) are the reaction between a diacid and diamine resulting in a salt. $R_5$ can be one of the following: $C_0$–$C_{10}$ alkylene, $C_3$–$C_{10}$ isoalkylene and $C_6$–$C_{10}$ arylene. Reactions (4) and (6) are often referred to as condensation polymerization. $R_6$ can be one of the following: $C_2$–$C_{10}$ alkylene and $C_3$–$C_{10}$ isoalkylene. In the aforementioned condensation polymerization, the repeating unit contains fewer atoms than the monomer, and necessarily, the molecular weight of the polymer as formed is less than the sum of the molecular weights of all the original monomer units which were combined in the reaction to form the polymer chain. Examples of $C_1$–$C_{10}$ alkyls are methyl, propyl, butyl, pentyl, etc.; examples of the $C_3$–$C_{10}$ isoalkyls are isopropyl, isobutyl, isopentyl and the like. Examples of $C_1$–$C_{10}$ alkylenes are as follows: methylene, dimethylene, trimethylene and the like; examples of $C_3$–$C_{10}$ isoalkylenes are the following: methyl trimethylene, 1,2-methyltetramethylene and the like; examples of $C_6$–$C_{10}$ arylenes are as follows: para-phenylene, meta-phenylene, 2,6-naphthalene and the like.

A variation of preparation reactions (1) and (2) are also disclosed in CHEMICAL ABSTRACT 3935k, Vol. 71 (1969), S. African Pat. No. 6,704,646.

Examples of HOR₄OH of reaction (1) are as follows: ethylene glycol, propylene glycol and trimethylene glycol. Examples of HOOCR₅COOH of reaction (3) are as follows: oxalic, malonic, succinic, glutaric, adipic, pimelic, suberic, azelaic, sebacic, undecanedioic, α,β-diethylsuccinic, α-methyl-α-ethyl suberic, terephthalic, isophthalic, 2,6-naphthalene dicarboxylic and 1,5-naphthalene dicarboxylic.

The polymers of present invention can also contain an antioxidant such as 1,3,5-trimethyl-2,4,6-tris-(3,5-ditertiarybutyl-4-hydroxybenzyl) benzene. Small amounts of antioxidant, e.g., 0.5 weight percent can be used or as much as 2.0 weight percent also can be satisfactory. Antioxidants other than the aforementioned one can be used. The antioxidant generally would be mixed in combination with the two polymers prior to melt blending. Other usual additives for polyamides such as delusterants and/or light stabilizers can also be incorporated.

Because of the complexity in naming the copolymers of polyamide and poly(dioxa-amide), a shorthand nomenclature is used herein. It is based in part on the nomenclature used to identify aliphatic polyamides. Numbers signifies the number of carbon atoms in a polymer. The letter "O" signifies oxygen and its relative location within the polymer; "N" signifies polyamide linkage; "T" signifies terephthalic. Thus "30303" refers to a diamine function while "6" refers to the diacid function. Therefore, "6" refers to six carbon paraffinic diacid and in particular adipic acid. Also "30203" indicates the number of paraffinic carbons and the "0" indicates the placement of oxygen. In this nomenclature a slash (/) designates a random copolymer whereas a double slash (//) indicates a block copolymer. Thus N-30203-6//6 indicates that blocks of N-30203-6 are connected within the copolymer with blocks of "6" (nylon-6). And N-30203-6/6//6 indicates that blocks of N-30203-6/6 are connected within the copolymer with blocks of "6" and that the block N-30203-6/6 is random within itself.

EXAMPLES

The following describes how the various novel polymers and their precursors were prepared, and the influence of certain variable upon their properties. Also reported are results on comparative polymers.

1. Preparation of 1,2-bis (β-cyanoethoxyethane)(NC—(CH₂)₂—O—(CH₂)₂—O—(CH₂)₂—CN To a 5 liter double walled (for water cooling) glass reactor with a bottom drain and stopcock was charged 930 grams (15 moles) of ethylene glycol and 45.6 grams of 40% aqueous KOH solution. Some 1620 grams (20.6 moles) of acrylonitrile (NC—CH=CH₂) were then added dropwise with stirring at such a rate that the temperature was kept below 35° C. After the addition was completed the mixture was stirred an additional hour and then allowed to stand overnight. The mixture was then neutralized to a pH of 7 by the addition of 6 molar HCl. After washing with saturated NaCl solution three times, the product was separated from the aqueous layer, dried over CaCl₂ and passed through an Al₂O₃ column to insure that all basic materials had been removed. The yield obtained was 90% of theoretical.

2. Preparation of 4,7-dioxadecamethylenediamine (NH₂(CH₂)₃—O—(CH₂)₂—O—(CH₂)₃—NH₂)

In an 800 milliliter hydrogenation reactor was charged 150 grams of 1,2-bis(β-cyanoethyxyethane), 230 milliliters of dioxane and about 50 grams of Raney Co. After purging the air the reaction was pressurized with hydrogen up to 2000 p.s.i. and heated to 100° C. As the hydrogen was consumed additional hydrogen was added until pressure remained constant. Upon cooling, the pressure was released and the catalyst was filtered. The dioxane was removed by atmospheric distillation. The remaining mixture was distilled by a 3 foot spinning band distillation unit. About 98 grams of 99.95%. pure material was obtained. The materials can be referred to as 30203 diamine.

3. Preparation of 4,7-dioxadecamethylene adipamide (N-30203-6 salt)

To a solution of 41.50 grams of adipic acid dissolved in a mixture of 250 milliliters of isopropanol and 50 milliliters of ethanol was added, with stirring, 50 grams of the 30203 diamine dissolved in 200 milliliters of isopropanol. An exothermic reaction occurred. Upon cooling, a polymer salt crystallized out of solution. The salt was collected on a Buchner funnel and subsequently recrystallized from a mixture of 400 milliliters of ethanol and 300 milliliters of isopropanol solution. The product dried in vacuo overnight at 60° C, had a melting point of 182° C and the pH of a 1% solution was 6.9. 85 grams (92% yield of theoretical) of the salt was obtained.

4. Preparation of 50/50 Random Component

About 27 grams of caprolactam, 27 grams of N-30203-6 salt, 0.5 gram of water and 0.1 gram of acetic acid were charged to a heavy walled polymer tube. The latter was purged of air, sealed and then heated at 250° C for about 6 hours. Afterwards the tube was broken at the tip and a long glass tube inserted for a nitrogen purge. The filled tube was heated at 255° C in a biphenyl vapor bath for 2 hours. During the latter heating nitrogen was passed through the glass tube. After heating for 2 hours, the tube was broken and the random polymer removed. The softening point of the polymer was low so that it had to be cut by hand because machine cutting created too much heat. The polymer had an inherent viscosity of 0.78 in a meta-cresol solution at 100° C.

The low softening point indicated that this component was amorphous. Amorphous polymers do not exhibit structural order among the chains. There are no regular repeating spacing or distances between the molecules. By comparison crystalline polymers are characterized by the capability of their molecules or, more correctly, segments in these molecules to form three-dimensionally ordered arrays exhibiting characteristic inter-or intra- molecular spacings. Increases in crystallinity generally increase strength.

5. Polymer Melt Blending

Suitable amounts of dried random component and nylon-6 were charged to a large test tube having two openings in the rubber stopper. The openings were for a helical stirrer and a nitrogen inlet. The container was purged of air. Afterwards, the nitrogen filled container was heated using a suitable liquid-vapor bath. The mixture of the two polymers was agitated with a helical stirrer powered by an air motor for the required time. Before allowing the molten polymer to cool the stirrer was lifted to drain the polymer. After solidification the material was broken up and dried for spinning.

6. Polymer Spinning and Drawing

After the aforementioned melt bleinding the polymer was charged to a micro spinning apparatus consisting of stainless steel tube (5/8 O.D. × 12) with a 0.037 capillary. The tube was heated with a vapor bath to the temperature consistent with the polymer. Generally about 245° C was used. Nitrogen was swept through the polymer until the polymer melted and sealed the capillary. After the polymer was completely melted and a uniform temperature had been reached (about 30 minutes) the nitrogen pressure was increased by about 30–50 p.s.i.g. (depending on polymer melt visosity) to extrude the polymer.

The fiber as it left the tube was drawn on a series of rollers and wound up on a bobbin. The first roller or feed roll was traveling at 35 ft/min. The filament was wrapped 5 times around this. After crossing a hot pipe maintained at about 50° C the filament was wrapped around the second roller or a draw roll (5 times) which speed varied depending on the draw ratio required (130–175 ft/min). Unlike commercial draw rolls, the fiber tended to abrade itself; that is the fiber coming off rubbed against the fiber coming on. This made high draw ratios difficult to obtain. The third roll had a removable bobbin and was driven at a slightly lower speed than the draw roller. The differences in speeds caused the fiber to be stretched.

Stretching or drawing orientates the molecules, i.e., places them in a signle plane running in the same direction as the fiber. Draw ratios refer to the ratio of the speed of the second roller or draw roll to the speed of the first roller or feed roll. Thus if the second roller was traveling at 175 feet per minute and the first roller at 35 feet per minute the draw ratio is 5 (175/35). This difference in speeds of the follers stretches the fiber.

7. Results of Tests and Comparative Runs

The accompanying Table I shows the fiber properties of various copolymers of blocks of random poly(dioxaamide) and blocks of polyamide as well as comparative data for nylon-6 and cotton.

Comparison of Runs 2-4 with Run 1 indicates that as the amount of random N-30203-6 incorporated with nylon-6 increases the moisture regain at various relative humidities increases. Same comparison of runs indicates that increasing the proportion of N-30203-6 in the copolymer does not adversely influence the tenacity, elongation and initial modulus properties of nylon-6.

Comparison of Runs 2-5 with Run 6 indicates that as the amount of poly (dioxa-amide) incorporated with nylon-6 increases, the moisture regain approaches that of cotton. Thus indicating that the novel copolymer has excellent moisture regain properties while still maintaining the other excellent physical properties of nylon-6.

Tenacity, elongation (elongation to rupture) and initial modulus (textile modulus) and the methods for obtaining such values are defined and described in Kirk-Othmer, ENCYCLOPEDIA OF CHEMICAL TECHNOLOGY, 2nd edition, Vol. 20, Textile Testing.

Moisture regain referes to the amount of moisture a dried sample of fiber picks up in a constant relative humidity atmosphere. Measurement of this property was carried out using a series of humidity chambers made from dessicators containing suitable saturated salt solutions (i.e., $NaNO_2$ = 65%; NaCl = 75%; KCl = 85% and $Na_2SO_3$ = 95%) at room temperature.

To determine moisture regain first a sample of the fiber was dried in a vacuum dessicator over $P_2O_5$. After a constant weight was obtained the sample was placed in one of the appropriate chambers. The chamber was then evacuated to speed up equilibrium. The fiber remained in the chamber until a constant weight was obtained. The increase in weight of the sample over the dried sample was the amount of moisture regained.

Table II discloses the weight loss during boil off incurred by the novel copolymer compared to nylon-6. The data of Table III indicates that boil off increases the moisture regain of the random copolymer as well as that of nylon-6.

Boil off refers to placing the fiber in boiling water for a specified length of time. Afterwards the weight loss was determined. Also after following the procedure described for determining moisture regain the incremental increase in percent moisture regain at 65% relative humidity was determined. Boil off can be considered as akin to a dye treatment.

The increase in moisture regain as a result of boil off is thought to best be understood by the following explanation. By placing the fiber in boiling water portions of the fiber relax, thus the orientated amorphous sections tend to open up. Boiling off speeds up the relaxation of the unnatural state. This opening up permits the fiber to take up more moisture than it otherwise would be capable of. Heating the fiber, by other than placing in boiling water, will also relax the fiber.

Accompanying Table IV shows the effect of percent of N-30203-6 in N-30203-6/6//6 on dye uptake. The data indicates that as the percent of N-30203-6 in N-30206-6/6//6 increases dye uptake increases. Compared to water molecules, dyes are larger molecules and cannot penetrate the crystalline structure of nylon fiber, thus dye uptake can be related to the amount of amorphous regions in the fiber.

The amount of dye uptake was measured in the following manner. The preweighed fibers were dyes in suitable containers at room temperature. The concentration of the "direct yellow 28" in the aqueous dye solution was measured before and after spectrophotometrically. The dyeing was considered complete when no decrease in dye concentration was observed over several hours. Prior to dyeing it was determined that the initial concentration of the dye in the bath had to be greater than $5.8 \times 10^{-5}$ grams/ milliliter so that the measured dye absorption was independent of the initial dye concentration.

8. Minimum Value for Repeating Units

To determine how few repeating units could be contained within a block and still retain its polymeric properties the data shown in Table V was obtained. To obtain the data three samples of caprolactam were polymerized at the various conditions shown in the table. Subsequently average molecular weights and melting points were determined. The foregoing two tests were also made on a sample of a purchased polymer. The obtained average molecular weight divided by the molecular weight of the repeat unit in the polymer gives the average value of number of repeating units (i.e., z) in a block. This value is also reported in Table V. A plot on semi-log graph paper of Runs 1–4 and an extrapolation of the foregoing indicates that with a value of 4 for z the melting point would be estimated 188° C. Thus, since there is only a decrease of 21° C in melting point despite the substantial decrease of 207 units in z, one can conclude that four repeating units can be contained in a block without adversely changing the properties of the block.

9. Others

Analogous results are obtained when nylon-6,6; nylon-6,10; nylon-11, MXD-6; PACM-10 and PACM-12 are used in place of nylon-6 in the polymer melt blending step (4). Also analogous results are obtained within step (3), adipic acid is replaced with one of the following acids: oxalic, malonic, succinic, glutaric, pimelic, suberic, azelaic, sebacic, undecanedioic, $\alpha,\beta$-diethylsuccinic, $\alpha$-methyl-$\alpha$-ethylsuberic, terephthalic, isophthalic, 2,6-naphthalene dicarboxylic and the like. When the ethylene glycol of step (1) is replaced with one of the following glycols: trimethylene propylene, tetramethylene and the like, analogous results are obtained.

TABLE I
COMMPARATIVE PROPERTIES OF COPOLYMER OF BLOCKS OF RANDOM POLY(DIOXA-AMIDE) AND POLYAMIDE

| | | | | Fiber Properties | | | | | | |
|---|---|---|---|---|---|---|---|---|---|---|
| Run | Material | Percent of 30203-6 in Material | Draw Ratio | Tenacity[a]* | Percent Elongation[a] | Initial Modulus* | Moisture Regain (%) at % Relative Humidity | | | |
| | | | | | | | 95 | 85 | 75 | 65 |
| 1 | nylon-6 | 0 | — | 3.7 | 45.0 | 11.5 | 7.6 | 5.8 | 4.5 | 4.1 |
| 2 | N-30203-6/6//6 | 5 | 3.7 | 2.6 | 37.0 | 14.5 | 8.8 | 6.6 | 6.0 | 4.2 |
| 3 | " | 10 | 3.7 | 2.9 | 34.7 | 15.4 | 11.5 | 8.4 | 6.9 | 4.3 |
| 4 | " | 15 | 3.7 | 2.3 | 28.9 | 11.4 | 11.6 | 9.7 | 7.2 | 4.9 |
| 5 | " | 20 | 3.9 | 2.3 | 63.7 | 9.45 | 13.3 | 10.3 | 9.5 | 5.2 |
| 6 | cotton | 0 | — | — | — | — | 14.5 | 11.8 | 9.5 | 7.6 |

[a]Ambient relative humidity, 40 monofilaments twisted together, average 7 or 8 samples per test, and after boil off.
[b]Blend time 30 minutes at 295° C.
*Units are grams/denier.

TABLE II
COMPARATIVE WEIGHT LOSS OF FIBERS DURING BOIL OFF

| Run | Material | Percent of 30203-6 in Material | % Weight Loss |
|---|---|---|---|
| 1 | nylon-6 | 0 | 1.4 |
| 2 | N-30203-6/6//6 | 20 | 1.8 |

TABLE III
COMPARATIVE EFFECT OF BOIL OFF ON MOISTURE REGAIN

| Run | Material | Percent of 30203-6 in Material | Increase in % Moisture at 65% Relative Humidity |
|---|---|---|---|
| 1 | nylon-6 | 0 | 0.5 |
| 2 | N-30203-6/6//6 | 20 | 1.5 |

TABLE IV
EFFECT OF PERCENT OF POLY(DIOXA-AMIDE) IN POLYAMIDE IN DYE UPTAKE[a]

| Run | Percent of N-30203-6 in N-30203-6/6//6 | Dye Absorption moles/gram of fiber × $10^2$ |
|---|---|---|
| 1 | 0 | 1.0 |
| 2 | 5 | 1.95 |
| 3 | 10 | 2.2 |
| 4 | 15 | 2.4 |

[a]Direct Yellow 28, $6 \times 10^{-5}$ grams/milliliter.

TABLE V

| | | Resultant Polymer (Caprolactam) | | |
|---|---|---|---|---|
| Run | Conditions | Average Molecular Weight[a] | Value of $z$[b] | Melting Point °C[c] |
| 1 | Purchased | 23,809 | 211 | 209 |
| 2 | 3 hrs at 250° C and 1 ml H$_2$O | 7,874 | 70 | 205 |
| 3 | 3 hrs at 250° C and 4 ml H$_2$O | 6,211 | 55 | 201 |
| 4 | 2 hrs at 250° C | 2,024 | 18 | 188 |
| 5 | monomer (caprolactam) | 113 | 1 | 70 |

[a]Molecular weight is based on amino ends.
[b]Average molecular weight divided by 113 which is molecular weight of nylon's monomer, i.e., caprolactam.
[c]Melting point determined by Differential Scanning Colorimeter; onset value.

THE INVENTION CLAIMED IS:
1. A copolymer having a molecular weight of about 5000–100,000 and the following two components:
(a) a block component consisting of the following groups:

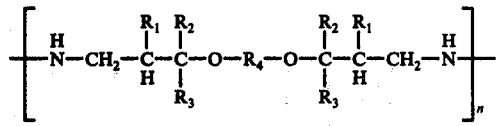

and

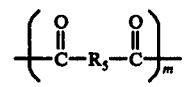

and one of the following:

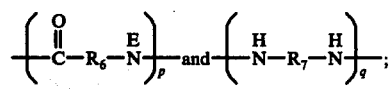

wherein the relative proportions of each are n = 1–10, m = 1–10, p = 0–10 and q = 0–10 and said groups within the block are randomized and wherein the

and the

form an amide linkage; and wherein $R_1$, $R_2$ and $R_3$ are selected from the group consisting of H, $C_1$–$C_{14}$ alkyls and $C_3$–$C_{10}$ isoalkyls; $R_4$ is selected from the group consisting of $C_1$–$C_{10}$ alkylenes and $C_3$–$C_{10}$ isoalkylenes; $R_5$ is selected from the group consisting of $C_0$–$C_{10}$ alkylenes, $C_3$–$C_{10}$ isoalkylenes and $C_6$–$C_{10}$ arylenes; $R_6$ and $R_7$ are selected from the group consisting of $C_5$–$C_{11}$ alkylenes; and wherein said block has a molecular weight of about 350–80,000;

(b) and a block component consisting of $$\left[ \begin{array}{c} \text{bivalent radical} \\ \text{of melt spinnable} \\ \text{polyamide having} \\ \text{no ether linkages} \end{array} \right]_z$$

wherein $z = 4\text{–}200$.

2. A copolymer according to claim 1 wherein the polymer is hydrophilic.

3. A copolymer according to claim 2 wherein the polymer has a percent moisture regain of at least 4% at a relative humidity of 65%.

4. A copolymer according to claim 1 wherein the bivalent radical polyamide is selected from the group consisting of the following: nylon-6; nylon-6,6 and PACM-12.

5. A copolymer according to claim 4 wherein the weight ratio of components (a) and (b) is such that $a/b = 0.10\text{–}1.25$.

6. A copolymer according to claim 5 wherein the polymer is hydrophilic.

7. A copolymer according to claim 6 wherein the polymer has a percent moisture regain of at least 4% at a relative humidity of 65%.

8. A copolymer according to claim 7 wherein $R_1$, $R_2$ and $R_3$ are selected from the group consisting of H and $C_1$–$C_5$ are alkyls.

9. A copolymer according to claim 8 wherein $R_4$ is a $C_1$–$C_5$ alkylene.

10. A copolymer according to claim 9 wherein $R_5$ and $R_6$ are $C_5$–$C_8$ alkylenes.

11. A copolymer according to claim 10 wherein the melt spinnable polyamide is nylon-6.

12. A fiber obtained by spinning the copolymer of claim 1.

13. A fiber obtained by spinning the copolymer of claim 3.

14. A fiber obtained by spinning the copolymer of claim 9.

15. A fiber obtained by spinning the copolymer of claim 11.

16. A fiber obtained by melt spinning the copolymer of claim 1.

17. A fiber obtained by melt spinning the copolymer of claim 3.

18. A fiber obtained by melt spinning the copolymer of claim 9.

19. A fiber obtained by melt spinning the copolymer of claim 11.

20. A monofilament obtained by extruding the copolymer of claim 1.

21. A monofilament obtained by extruding the copolymer of claim 3.

22. A monofilament obtained by extruding the copolymer of claim 9.

23. A monofilament obtained by extruding the copolymer of claim 11.

24. A yarn obtained by twisting fibers of the copolymer of claim 1.

25. A yarn obtained by twisting fibers of the copolymer of claim 3.

26. A yarn obtained by twisting fibers of the copolymer of claim 9.

27. A yarn obtained by twisting fibers of the copolymer of claim 11.

28. A fabric obtained by weaving yarn of the copolymer of claim 1.

29. A fabric obtained by weaving yarn of the copolymer of claim 3.

30. A fabric obtained by weaving yarn of the copolymer of claim 9.

31. A fabric obtained by weaving yarn of the copolymer of claim 11.

32. A fabric obtained by knitting yarn of the copolymer of claim 1.

33. A fabric obtained by knitting yarn of the copolymer of claim 3.

34. A fabric obtained by knitting yarn of the copolymer of claim 9.

35. A fabric obtained by knitting yarn of the copolymer of claim 11.

36. A fabric obtained by knitting monofilament of the copolymer of claim 1.

37. A fabric obtained by knitting monofilament of the copolymer of claim 3.

38. A fabric obtained by knitting monofilament of the copolymer of claim 9.

39. A fabric obtained by knitting monofilament of the copolymer of claim 11.

40. A nonwoven fabric obtained by laminating the copolymer of claim 1.

41. A nonwoven fabric obtained by laminating the copolymer of claim 3.

42. A nonwoven fabric obtained by laminating the copolymer of claim 9.

43. A nonwoven fabric obtained by laminating the copolymer of claim 11.

44. A fiber comprising the polymer of claim 1.

45. A fiber comprising the polymer of claim 3.

46. A fiber comprising the polymer of claim 9.

47. A fiber comprising the polymer of claim 11.

48. A monofilament comprising the polymer of claim 1.

49. A monofilament comprising the polymer of claim 3.

50. A monofilament comprising the polymer of claim 9.

51. A monofilament comprising the polymer of claim 11.

52. A yarn comprising the polymer of claim 1.

53. A yarn comprising the polymer of claim 3.

54. A yarn comprising the polymer of claim 9.

55. A yarn comprising the polymer of claim 11.

56. A fabric comprising the polymer of claim 1.

57. A fabric comprising the polymer of claim 3.

58. A fabric comprising the polymer of claim 9.

59. A fabric comprising the polymer of claim 11.

60. A nonwoven fabric comprising the polymer of claim 1.

61. A nonwoven fabric comprising the polymer of claim 3.

62. A nonwoven fabric comprising the polymer of claim 9.

63. A nonwoven fabric comprising the polymer of claim 11.

* * * * *

UNITED STATES PATENT OFFICE
CERTIFICATE OF CORRECTION

PATENT NO. : 4,113,794
DATED : September 12, 1978
INVENTOR(S) : ROBERT M. THOMPSON and RICHARD S. STEARNS It is certified that error appears in the above-identified patent and that said Letters Patent are hereby corrected as shown below:

Column 7,

Equation (2), after (III) delete "=" and substitute --- + ---;

Equation (2), between $NH_2-CH_2-\underset{H}{\overset{R_1}{C}}-$ and $-O-$ insert --- $-\underset{R_3}{\overset{R_2}{C}}-$ ---;

Equation (3), delete " $-\underset{R_3}{\overset{R}{L}}-$ " and substitute --- $-\underset{R_3}{\overset{R_2}{C}}-$ ---;

Equation (4), delete "$\overline{CO(CH_2)_5NH}$" and substitute --- $\overline{CO(CH_2)_5NH}$ ---.

Signed and Sealed this

Twentieth Day of February 1979

[SEAL]

Attest:

RUTH C. MASON
*Attesting Officer*

DONALD W. BANNER
*Commissioner of Patents and Trademarks*